(12) United States Patent
Eisele et al.

(10) Patent No.: US 9,638,520 B2
(45) Date of Patent: May 2, 2017

(54) MEASURING APPARATUS AND MEASURING DEVICE FOR MEASURING A TARGET OBJECT IN A MULTIDIMENSIONAL MANNER

(75) Inventors: Andreas Eisele, Leinfelden-Echterdingen (DE); Bernd Schmidtke, Leonberg (DE); Ulrich Kallmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 14/005,808

(22) PCT Filed: Feb. 2, 2012

(86) PCT No.: PCT/EP2012/051719
§ 371 (c)(1),
(2), (4) Date: Nov. 27, 2013

(87) PCT Pub. No.: WO2012/126659
PCT Pub. Date: Sep. 27, 2012

(65) Prior Publication Data
US 2014/0078491 A1  Mar. 20, 2014

(30) Foreign Application Priority Data
Mar. 18, 2011 (DE) .......................... 10 2011 005 746

(51) Int. Cl.
*G01C 3/08* (2006.01)
*G01S 7/486* (2006.01)
(Continued)

(52) U.S. Cl.
CPC .............. *G01C 3/08* (2013.01); *G01S 7/4863* (2013.01); *G01S 17/42* (2013.01); *G01S 17/89* (2013.01)

(58) Field of Classification Search
CPC ......... G01C 3/08; G01S 7/4863; G01S 17/42; G01S 17/89
See application file for complete search history.

(56) References Cited

U.S. PATENT DOCUMENTS 5,892,575 A    4/1999  Marino
5,988,862 A   11/1999  Kacyra et al.
(Continued)

FOREIGN PATENT DOCUMENTS

DE        102 35 562 A1    2/2004
DE   10 2006 052 813 A1    5/2008
(Continued)

OTHER PUBLICATIONS

International Search Report corresponding to PCT Application No. PCT/EP2012/051719, mailed May 31, 2012 (German and English language document) (5 pages).

*Primary Examiner* — Luke Ratcliffe
*Assistant Examiner* — Samantha K Abraham
(74) *Attorney, Agent, or Firm* — Maginot, Moore & Beck LLP

(57) ABSTRACT

The disclosure relates to a measuring apparatus, in particular a handheld measuring apparatus, for measuring a target object in a multidimensional manner, wherein the distance to individual object points of the target object is sequentially measured, in particular using a phase-measuring system, which apparatus has at least: a transmitting device for emitting optical measuring radiation towards the target object; a receiving device having a detection area for detecting optical measuring radiation returning from the target object; a scanning system for deflecting the optical measuring radiation, and an evaluation device for determining measured distance values. The detection area of the receiving device has a plurality of pixels, wherein each pixel has at least one SPAD, and wherein each of the plurality of
(Continued)

pixels is connected to the evaluation device. The disclosure also relates to a measuring device having such a measuring apparatus.

20 Claims, 9 Drawing Sheets

(51) Int. Cl.
*G01S 17/42* (2006.01)
*G01S 17/89* (2006.01)

(56) References Cited

U.S. PATENT DOCUMENTS

| | | |
|---|---|---|
| 6,452,665 B1 | 9/2002 | Kikuchi |
| 2004/0021852 A1 | 2/2004 | DeFlumere |
| 2007/0247690 A1* | 10/2007 | Baik .................... G02B 26/105 |
| | | 359/216.1 |

FOREIGN PATENT DOCUMENTS

| | | |
|---|---|---|
| DE | 10 2009 040 990 A1 | 3/2011 |
| EP | 1 209 441 A1 | 5/2002 |
| WO | 2011/029645 A1 | 3/2011 |
| WO | WO 2011029645 A1 * | 3/2011 |

* cited by examiner

MEASURING APPARATUS AND MEASURING DEVICE FOR MEASURING A TARGET OBJECT IN A MULTIDIMENSIONAL MANNER

This application is a 35 U.S.C. §371 National Stage Application of PCT/EP2012/051719, filed on Feb. 2, 2012, which claims the benefit of priority to Serial No. DE 10 2011 005 746.3, filed on Mar. 18, 2011 in Germany, the disclosures of which are incorporated herein by reference in their entirety.

The disclosure relates to a measuring device for measuring a distance between the measuring device and a target object with the aid of optical measurement radiation. In particular, the disclosure relates to a measuring device for multi-dimensional measuring of a target object.

BACKGROUND

Commercially available laser ranging instruments are generally based on a heterodyne method which continuously measures a phase and simultaneously mixes in a smaller frequency range. Both the intensity of the light source (laser) and the sensitivity of the detector are modulated at high frequencies with a small frequency shift with respect to one another. This creates a low-frequency beat, the phase shift of which is proportional to the distance of the measurement object.

A substantial advantage in this method is the low time-resolution demands on the electronics in the low-frequency signal processing range. However, a measurement, which is continuous in time and generally takes longer than the pulse circulation time between transmitter and receiver, is required. Good optical isolation between transmission and reception path is therefore necessary.

Such a laser ranging instrument is known from e.g. DE 10235562 A1.

3D laser scanners combine the function of ranging with a mechanical scanner that provides the option of realizing ranging sequentially at defined emission angles. The method for determining the distance is generally a pulse circulation time measuring method. A short pulse laser generates a light pulse which is directed at the measurement point targeted by the scanner via the transmission path. The pulse scattered back from the measurement point is imaged on a fast detector via the reception path. The light run-time between pulse generation and reception and hence the distance is determined for the targeted measurement point.

These 3D laser scanners are distinguished in particular by virtue of the fact that the optical axis of the reception path corresponds to the transmission path within the scanner assembly (there is no parallax). The mechanical deflection unit (scanner) is only required once and hence only needs to be aligned once as well. There are only low demands on the optical isolation between transmission and reception path. Since these are pulse circulation time measuring methods, there are, on the other hand, high demands on the time resolution capability of the signal processing electronics.

By way of example, such laser scanners are described in U.S. Pat. No. 5,988,862 or in EP 01209441 B1.

SUMMARY

Scanning elements for the above-described ranging instruments are currently not available. The aforementioned difficulty of the optical isolation of the two paths leads to the necessity of separating transmission and reception path, even within the mechanical scanner unit.

Separate scanner units for transmission and reception path must in turn also be very well aligned with respect to one another for all scanner positions such that the optical axes of both paths are sufficiently well parallel to one another. The parameter which scales this demand is the size of the detector.

At the same time, the detector size also determines the field-of-view of the reception path, which should in turn be kept as small as possible for a good signal-to-noise ratio. With this meaning, an ideal detector is accordingly a large-area sensor array on which in each case only that region which is relevant to the signal evaluation is activated.

A core of the disclosure lies in combining a large-area time-resolving optical sensor with separate optical systems for transmission and reception path for angle-resolving laser ranging configured substantially according to the prior art.

This is realized by a device for multi-dimensional measuring of an object, wherein the distance of an individual object point is brought about by a light run-time measurement and the light beam scans the whole surface of the object to be measured, either sequentially along a line or in two dimensions. It is characterized by the use of a large-area time-resolving optical sensor with, at the same time, separate optical systems for transmission and reception path.

Here, the optical sensor in particular has a detection area with a multiplicity of pixels, wherein each pixel has at least one SPAD (single photon avalanche photodiode) and wherein every one of the multiplicity of pixels is connected to an evaluation apparatus.

Advantages of such an embodiment include:
lower demands on the time resolution capability of the electronic signal processing device by a mixing and phase-measuring method compared to a pulse run-time measurement with a comparable accuracy.
a very good optical separation between transmission and reception path (required in particular for phase-measuring methods).
lower adjustment demands on transmission and reception path as a result of the large-area detector.
the option of improving the signal-to-noise ratio and hence the range by virtue of use being made of a detector array with selectable pixels.
cost savings as a result of a SPAD detector array being used.

Furthermore, the device according to the disclosure has at least one of the following advantages:
increasing an adjustment tolerance of a reception optical unit of the ranging device in relation to a detector;
reducing a complexity of and demands on a reception optical unit;
increasing a dynamic range, particularly when measuring small distances;
optimizing a signal-to-noise ratio, particularly when measuring large distances; and/or
reducing a chip area of an integrated circuit required for the evaluation.

The measuring device according to the disclosure for optical ranging has a transmission apparatus for emitting optical measurement radiation toward a target object, a reception apparatus with a detection area for detecting optical measurement radiation returning from the target object and an evaluation apparatus. Here, the detection area of the reception apparatus has a multiplicity of pixels, wherein each pixel has at least one SPAD (single photon avalanche diode). Every one of the multiplicity of pixels is connected to the evaluation apparatus, either directly or indirectly over further interposed components. Here, the separate transmission and reception apparatuses are designed in such a way that optical measurement radiation returning from the target object in each case illuminates a plurality of pixels simultaneously when the ranging apparatus is used as intended. Here, the evaluation apparatus is designed to establish a distance between the measuring device and the target object on the basis of an evaluation of detection signals from several pixels, in particular several ones of the simultaneously illuminated pixels.

The measuring device according to the disclosure therefore corresponds to a laser ranging instrument with an additional scanning system. By way of example, the scanning system consists of respectively one galvano scanner for the transmission path and the reception path. As a result of using two separate mirrors, the optical paths are very well isolated from one another in respect of crosstalk.

Here, a large detector array is used as detector, in which individual pixel groups can be combined or activated. As a result of this, the tolerance demands on the parallel property of the two mirrors can be significantly reduced. Here, each pixel consists of at least one light-sensitive element.

Array sizes of several millimeters can be realized. By way of example, the individual detector pixels are embodied as single photon avalanche diodes (SPADs). However, modulated CCDs or CMOS pixels are also conceivable.

In an advantageous embodiment of the disclosure, the measuring device according to the disclosure is integrated into a housing. This is how a corresponding measuring instrument can be realized. This measuring instrument, which, in particular, can be embodied as a hand-held measuring instrument, enables ranging in different directions, particularly without it being necessary for the instrument itself to be moved, e.g. rotated. The measuring device therefore enables a deflection of the measurement beam relative to the housing of the measuring instrument.

A SPAD can have the property that it, unlike conventional light-sensitive elements with analog operation, does not supply a detection signal which is linearly dependent on the impinging radiation but rather generates an individual signal in the case of each impinging photon. After a photon impinges thereon, the SPAD cannot be activated again for a certain dead time, which can lie in the range of, for example, 1 to 100 ns. This is also referred to as a paralyzable response characteristic. The count rate with which a SPAD can count impinging photons therefore has an upper limit as a result of the dead time. It may therefore be advantageous to provide several smaller SPADs within one pixel instead of a single large-area SPAD and, for example, combine detection signals from SPADs contained in a single pixel with the aid of a combiner. By way of example, the combiner can in this case be embodied in the form of an OR gate or in the form of a bus. This allows the maximum photon count rate that can be achieved by the pixel to be increased or, expressed differently, the dead time of the pixel between individual detection events to be reduced. Furthermore, a pulse shortener can be arranged between a SPAD and a combiner or bus in order to shorten a digital signal generated by the SPAD in time and thereby enable a shortened overall dead time and an increased photon count rate of the system.

The number of SPADs or the area of SPADs contained in a pixel can be variably selected, depending on the location of the pixel within the detection area of the reception apparatus. By way of example, it may be known that the measurement radiation returning from the target object can impinge upon the detection area of the reception apparatus at a different position and/or with a different cross-sectional area, depending on the distance of the target object from the measuring device. The number of SPADs or the area of SPADs within a pixel can accordingly be adapted to the expected impinging light intensity, depending upon position. By adapting the areas of the SPADs and/or the number of SPADs within a pixel, it is possible to optimize a dynamic range of the measuring device. By adapting the pixel areas to a laser spot size, it is possible to optimize a signal-to-noise ratio.

The transmission apparatus can be a light source, for example in the form of an LED, a laser or a laser diode, which emits light toward the target object in a time-modulated fashion. Here, the time modulation can be continuous and/or periodic, e.g. sinusoidal. It is also possible to emit pulse trains, e.g. non-periodic pulse trains such as e.g. in the form of so-called pseudo-noise pulse sequences.

The reception apparatus can differ from reception apparatuses as used in conventional ranging instruments to the extent that a multiplicity of pixels can be provided within a detection area instead of light-sensitive elements, operating on analog principles, which can optionally be switched together in order to provide an analog overall signal, wherein each pixel contains one or more SPADs. As will be explained in more detail below, a SPAD here is a light-sensitive element which supplies a digital detection signal depending on an impinging light intensity. Here, each pixel can be connected to the evaluation apparatus, either directly or, for example, with the interposition of a multiplexer, which is designed to transmit detection signals from several pixels in a selective fashion. By way of example, what can be achieved by this is that detection signals of individual pixels or a group of pixels can be evaluated by the evaluation apparatus, independently of detection signals from other pixels.

The transmission apparatus and the reception apparatus are designed and adapted to one another in such a way that optical measurement radiation returning from the target object illuminates a plurality of pixels at the same time under normal measurement conditions, i.e., for example, in the case of measurement distances of a few centimeters up to several 100 meters. However, the fact that a plurality of pixels are illuminated simultaneously should not, unlike in conventional 3D-cameras, in this case be utilized to detect an image of the target object or a spatial resolution in respect of the distance to individual portions on a surface of the target object but should, as will be explained in more detail below, inter alia enable advantages in respect of a detection sensitivity and/or an adjustment tolerance. The distance between the measuring device and the target object is in this case established on the basis of an evaluation of detection signals from several pixels, in particular several of the pixels illuminated simultaneously.

To this end, the transmission apparatus can emit a measurement beam, the cross-section of which is sufficiently large for the portion of the measurement beam returning from the target object always to illuminate a plurality of pixels. In order to focus the measurement radiation returning from the target object and guide it onto the detection area, in order thereby to ensure a sufficiently strong detection signal, provision can be made within an optical path from the transmission apparatus to the reception apparatus for a simple optical unit, for example in the form of one or more lenses. This simple optical unit can, in a cost-saving and complexity-reducing manner, be embodied as a non-automatically focusing optical unit ("fixed focus"). Since such a non-automatically focusing optical unit with a fixed focal length is only able to focus a measurement beam returning from the target object onto the detection area of the reception apparatus in an optimum manner, i.e. with the smallest spot diameter, when the target object is situated at the object distance from the measuring device corresponding to the focal length and image plane, the number of pixels which are illuminated simultaneously by measurement radiation returning from the target object can vary, depending on a distance between the target object and the measurement object. By way of example, the optimization of the optical reception system for receiving measurement radiation from target objects that are far away with a large object distance can mean that focal length and image distance are to be selected in such a way that the geometric imaging condition is achieved for the large object distance. Hence, in the case of a large distance, it is possible to achieve the smallest spot diameter in the image plane ("the image is in focus"). By setting the focal length and image plane, the number of pixels which are illuminated in the case of a target object being situated more closely can be significantly larger than in the case of a target object situated far away. In the case of a target object situated more closely, the returning measurement radiation can no longer be imaged in focus, and so the illuminated region of the detection area can be correspondingly larger.

Since the detection signals of individual pixels can be evaluated independently of one another, the reception apparatus and the evaluation apparatus can be designed to establish a distance between the measurement device and the target object on the basis of an evaluation of detection signals only of pixels onto which light of the area of the target object illuminated by the transmission apparatus is radiated back. In other words, the evaluation apparatus can for example initially establish which pixels of the detection area in actual fact receive measurement radiation of the transmission apparatus and which pixels merely detect background radiation in a preliminary measurement and can subsequently merely use the detection signals of the pixels illuminated by the measurement radiation for the actual distance determination. As a result of this, a signal-to-noise ratio can be substantially increased.

In order to be able to establish the distance between the measuring device and the target object, the evaluation apparatus can have at least one distance determination apparatus (in part also known as "binning scheme"). The distance determination apparatus can be designed to establish a flight time of measurement radiation between an emission by the transmission apparatus and a detection on the detection area of the measurement radiation returning from the target object and determine a distance therefrom. To this end, the distance determination apparatus can compare information, provided by the transmission apparatus, relating to the time modulation of emitted measurement radiation with detection signals provided by the reception apparatus. By way of example, in the case of emitted measurement radiation with periodic modulation, a corresponding distance can be established from a phase difference between an emission signal and a detection signal.

In principle, a single distance determination apparatus can suffice for establishing a distance between the measuring device and the target object. In order to keep the number of distance determination apparatuses small, it may be advantageous to guide the detection signals from individual pixels or a group of pixels to a distance determination apparatus in succession, for example with the aid of a multiplexer. As a result of such a sequential processing of detection signals, there may be an increase in the overall measurement duration. Alternatively, each pixel can be assigned its own distance determination apparatus. In this case respectively one distance can be determined from each of the detection signals from the multiplicity of pixels, possibly parallel in time with respect to one another, and a distance, ultimately to be determined, between the device and the target object can finally be established, for example by averaging, from the multiplicity of determined distances. However, to this end, it may be necessary to provide a very large number of distance determination apparatuses in the measuring device, which may render the design and the production of the measuring device complicated.

As a compromise between these two extreme alternatives, as it were, a plurality of pixels can be connected to one distance determination apparatus and the distance determination apparatus can be designed to determine the distance on the basis of detection signals from the plurality of pixels. The evaluation apparatus can have a plurality of distance determination apparatuses and can be designed to determine the distance between the measuring device and the target object on the basis of the distances determined by the distance determination apparatuses, for example by forming an average.

A SPAD can have the property that it, unlike conventional light-sensitive elements with analog operation, does not supply a detection signal which is linearly dependent on the impinging radiation but rather generates an individual signal in the case of each impinging photon. After a photon impinges thereon, the SPAD cannot be activated again for a certain dead time, which can lie in the range of, for example, 1 to 100 ns. This is also referred to as a paralyzable response characteristic. The count rate with which a SPAD can count impinging photons therefore has an upper limit as a result of the dead time. It may therefore be advantageous to provide several smaller SPADs within one pixel instead of a single large-area SPAD and, for example, combine detection signals from SPADs contained in a single pixel with the aid of a combiner. By way of example, the combiner can in this case be embodied in the form of an OR gate or in the form of a bus. This allows the maximum photon count rate that can be achieved by the pixel to be increased or, expressed differently, the dead time of the pixel between individual detection events to be reduced. Furthermore, a pulse shortener can be arranged between a SPAD and a combiner or bus in order to shorten a digital signal generated by the SPAD in time and thereby enable a shortened overall dead time and an increased photon count rate of the system.

The number of SPADs or the area of SPADs contained in a pixel can be variably selected, depending on the location of the pixel within the detection area of the reception apparatus. By way of example, it may be known that the measurement radiation returning from the target object can impinge upon the detection area of the reception apparatus at a different position and/or with a different cross-sectional area, depending on the distance of the target object from the measuring device. The number of SPADs or the area of SPADs within a pixel can accordingly be adapted to the expected impinging light intensity, depending upon position. By adapting the areas of the SPADs and/or the number of SPADs within a pixel, it is possible to optimize a dynamic range of the measuring device. By adapting the pixel areas to a laser spot size, it is possible to optimize a signal-to-noise ratio.

By way of example, if a non-automatically focusing optical unit, which is designed to image or focus in an optimum fashion target objects that are far away, is arranged in the light path between the transmission apparatus and the reception apparatus, the returning measurement radiation for target objects that are far away can be focused with a small spot diameter. Within such a region of the detection area, it may be advantageous for each pixel to contain merely a single SPAD or only a few SPADs. If more closely situated target objects are targeted by means of such a fixed focus measuring device, the returning measurement radiation cannot be focused as a small spot on the detection area but rather impinges, possibly defocused, on a relatively large portion of the detection area. Overall, more pixels are then illuminated in this case than in the case of a target object situated far away.

It may therefore be advantageous to combine a plurality of SPADs to form a single pixel (or "sub-array" or "cluster" of SPADs) in each case in edge regions of the illuminated portion of the detection area.

By way of example, the transmission apparatus and the reception apparatus can be arranged next to one another along a parallax axis. Such so-called biaxial measuring systems can be advantageous in that there is no need for complicated radiation splitting for selecting the returning measurement beam. The measurement beam emitted by the transmission apparatus and returning from the target object can in this case impinge upon the detection area at a different point along the parallax axis and can have different cross-sections, depending on the distance of the target object. In this case, it may be advantageous to vary the number of SPADs contained in a pixel depending on the location of the pixel along the parallax axis. In particular, it may be advantageous to select the number of SPADs contained in a pixel to be smaller in pixels close to the transmission apparatus than in pixels far away from the transmission apparatus.

Alternatively, the transmission apparatus and the reception apparatus can be arranged coaxially with respect to one another. What can be achieved in the case of such a monoaxial measuring device, for example with the aid of semitransparent mirrors, is that the center of the region of the detection area illuminated by the returning radiation remains largely constant in space, independent of the distance of the target object. However, the cross section of the illuminated region on the detection area can continue to depend on the distance of the target object. In the case of target objects that are far away and an optical unit with a long focal length, there may be a small illuminated spot and, in the case of more closely situated target objects, there may be a larger illuminated spot. It may be advantageous to select the number of SPADs contained in a pixel to be smaller in pixels close to the center of the detection area than in pixels at a distance from the center of the detection area.

Possible aspects, advantages and embodiments of the disclosure were described above with reference to individual embodiments of the disclosure. The description, the associated figures and the claims contain several features in combination. A person skilled in the art will also consider these features individually, in particular also the features of different exemplary embodiments, and combine these to form expedient further combinations.

BRIEF DESCRIPTION OF THE DRAWINGS

In the following text, embodiments of the disclosure and partial aspects contained therein are described with reference to the attached figures. The figures are merely schematic and not drawn to scale. The same or similar reference signs in the figures denote the same or similar elements.

DETAILED DESCRIPTION

Figure 1A:
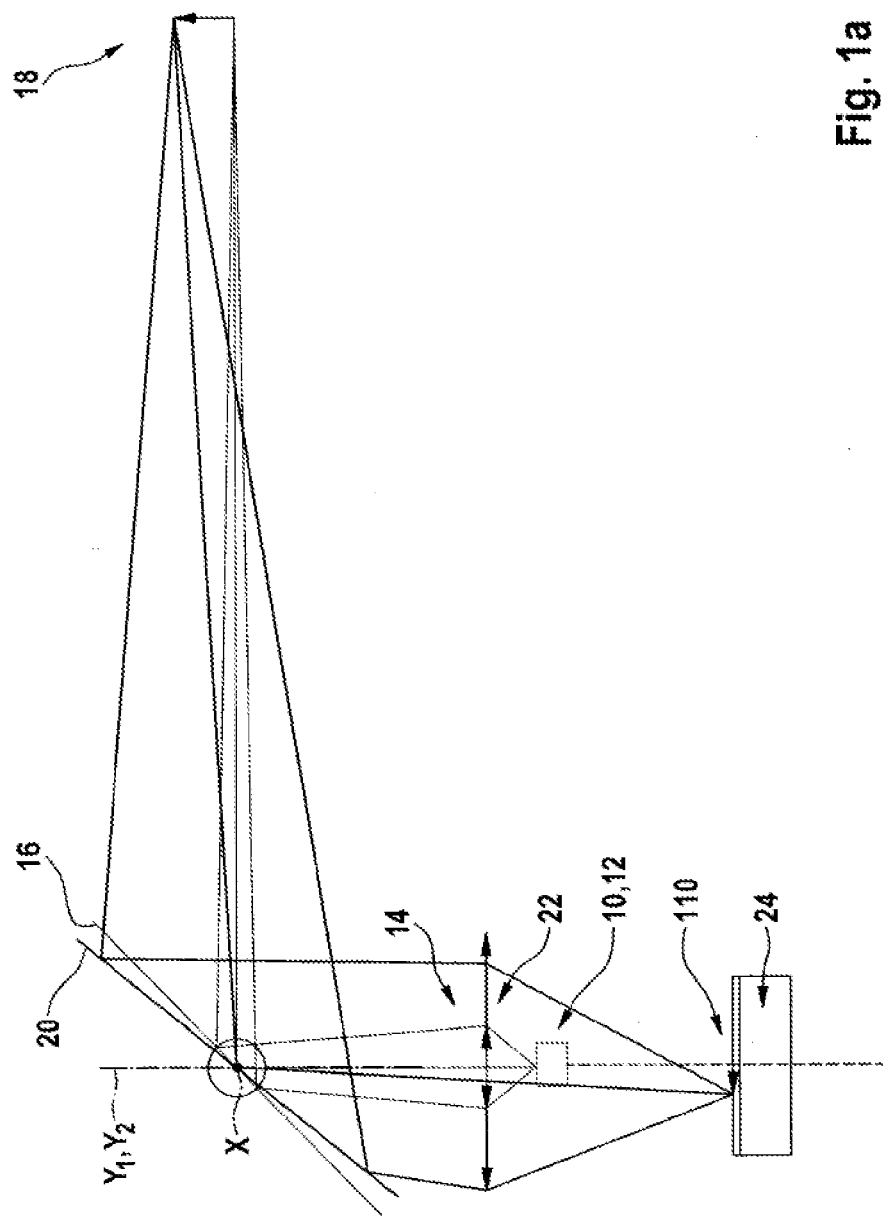
FIG. 1 shows, in a schematic illustration, a measuring device for optical ranging in accordance with an embodiment of the present disclosure.
Figure 1B:
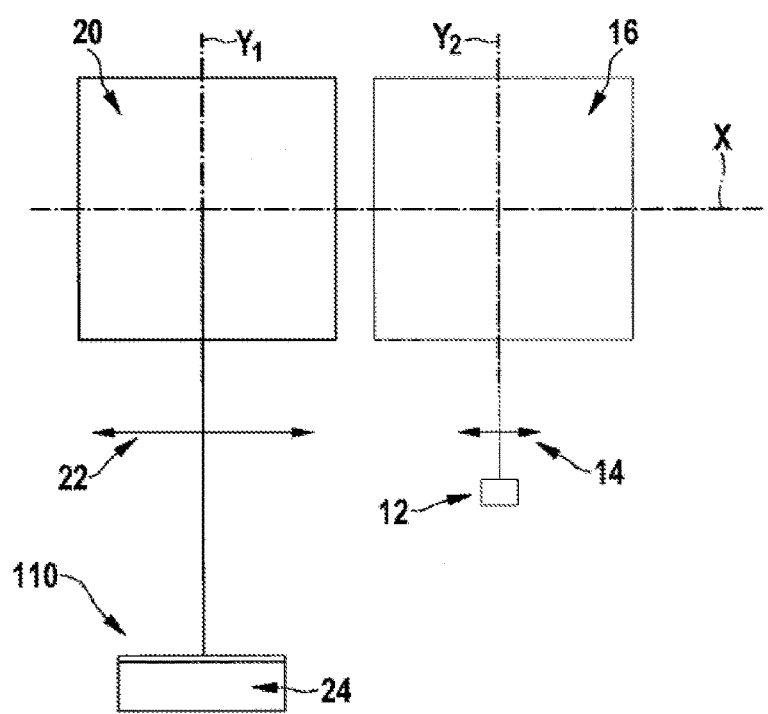

The images of FIG. 1 show the measuring system according to the disclosure in the embodiment of a laser ranging instrument with an additional scanner system in a very schematic illustration for clarifying the measurement principle. The functionality of electric-optical ranging instruments, in particular of those ranging instruments embodied as phase-measuring systems, is assumed to be known. The scanner system consists of in each case one galvano scanner for the transmission path and the reception path. As a result of using two separate mirrors, the optical paths are very well isolated from one another in respect of crosstalk.

Here, FIG. 1a shows the measuring system according to the disclosure in a very schematic plan view. The measurement signal is routed to a mirror 16 which can move on at least two axes via a modulated light source 10, which is realized by a laser diode 12, and a collimator 14. The measurement or target object 18 is scanned by means of the controlled mirror, i.e. the whole surface of the measurement object 18 to be measured, which is generally a two-dimensional or three-dimensional object, is scanned sequentially along a line or in two-dimensional fashion.

Via a mirror 20 of the reception system and a reception lens 22, the measurement signal returning from the measurement object reaches the detector surface 110 of a detector 24 which converts the optical signal into electric signals (as will still be explained below), from which then the respective distance to the object points of the target object to be measured are determined.

Both mirrors 16 and 20 are rotated synchronously about the X-axis such that the laser beam can follow a line on the object surface of the target object.

Additionally, the mirrors 16 and 20 can optionally also be rotated synchronously about the Y-axis such that two-dimensional scanning becomes possible. The angle-dependent distance variation emerging as a result of the parallaxes can be corrected for by a system calibration.

Image 1b of FIG. 1 shows the schematic design in a second perspective for clarifying the arrangement of transmission and reception path.

The measuring device according to the disclosure is advantageously integrated into a housing 200 and forms a measuring instrument. This is clarified schematically in FIG. 9 in corresponding views. Such a measuring instrument, which, in particular, is embodied as hand-held measuring instrument, can have an output unit in the form of a display. Moreover, the measuring instrument according to the disclosure has a device-internal energy supply in the form of replaceable batteries or rechargeable battery cells. A corresponding energy source which is fixedly integrated into the housing and can be unloaded by means of an interface on the housing is also possible.

Furthermore, the images of FIG. 1 illustrate a slight maladjustment between transmission mirror and reception error. (In this respect, see in particular FIG. 1a.) In the image on the detector plane 110, this leads to a deviation of the imaged laser spot from the optical axis of the reception path. The size of the detector 22 determines the field-of-view of the optical reception path. If the mirror maladjustment is greater than the field-of-view, the laser spot is no longer imaged on the detector and a measurement is no longer possible. Example: with a focal length of 30 mm and a detector size of 30 μm, an angle accuracy of 1 mrad follows as parallel property demand on the two mirrors.

Hence, a large detector array is used as detector 20, in which individual pixel groups can be combined or activated. (In this respect, see in particular the subsequent FIG. 7 or 8.) This is how the tolerance demands on the parallel property of the two mirrors can be significantly reduced.

Array sizes of several millimeters can be realized. By way of example, the individual detector pixels 101 are designed as single photon avalanche diodes (SPADs). However, modulated CCDs or CMOS pixels are also feasible.

A SPAD can have the property that it, unlike conventional light-sensitive elements with analog operation, does not supply a detection signal which is linearly dependent on the impinging radiation but rather generates an individual signal in the case of each impinging photon. After a photon impinges thereon, the SPAD cannot be activated again for a certain dead time, which can lie in the range of, for example, 1 to 100 ns. This is also referred to as a paralyzable response characteristic. The count rate with which a SPAD can count impinging photons therefore has an upper limit as a result of the dead time. It may therefore be advantageous to provide several smaller SPADs within one pixel instead of a single large-area SPAD and, for example, combine detection signals from SPADs contained in a single pixel with the aid of a combiner. By way of example, the combiner can in this case be embodied in the form of an OR gate or in the form of a bus. This allows the maximum photon count rate that can be achieved by the pixel to be increased or, expressed differently, the dead time of the pixel between individual detection events to be reduced. Furthermore, a pulse shortener can be arranged between a SPAD and a combiner or bus in order to shorten a digital signal generated by the SPAD in time and thereby enable a shortened overall dead time and an increased photon count rate of the system.

The number of SPADs or the area of SPADs contained in a pixel can be variably selected, depending on the location of the pixel within the detection area of the reception apparatus. By way of example, it may be known that the measurement radiation returning from the target object can impinge upon the detection area of the reception apparatus at a different position and/or with a different cross-sectional area, depending on the distance of the target object from the measuring device. The number of SPADs or the area of SPADs within a pixel can accordingly be adapted to the expected impinging light intensity, depending upon position. By adapting the areas of the SPADs and/or the number of SPADs within a pixel, it is possible to optimize a dynamic range of the measuring device. By adapting the pixel areas to a laser spot size, it is possible to optimize a signal-to-noise ratio.

Instead of a galvano scanner, use can also be made of beam deflection units operating on diffractive principles.

Furthermore, there is the option of dispensing with a scanning system in the reception path since the sensor element, which is large compared to the prior art, generates a sufficiently large optical field-of-view when suitable passive optical components (lenses) are used.

The sensor additionally allows the utilization of only specific portions of the sensor for the measurement. As a result of this, the stray-light signal to be expected in the case of a non-scanning reception system can be reduced significantly by virtue of only the relevant sensor regions being read out. The selection of relevant sensor regions can be brought about by the known beam output direction largely fixing the directional components of the back-scattered radiation.

Peculiarities of the large-area detector and the advantages thereof for a scanning system should subsequently be described in more detail.

The detection signals generated by an individual SPAD or a combination of SPADs can be fed to one or more distance determination apparatus(es) contained in an evaluation apparatus 36. The distance determination apparatus can sum the detection signals and generate a signal therefrom, which signal corresponds to a time-dependent intensity of the light signal impinging on the respective SPADs or to the light intensity. By putting this signal in relation with an excitation signal which specifies the time profile of the photon rate emitted by the transmission apparatus, it is possible to deduce a photon flight time from the transmission apparatus to the target object and back to the transmission apparatus. If the transmission apparatus periodically modulates the emitted light, for example in a sinusoidal fashion, a flight time can be established from a phase difference between the emitted and the detected measurement radiation.

In optoelectronics, the term "single photon avalanche diode" (SPAD), which sometimes is also designated as a Geiger mode avalanche photodiode or G-APD, is used for a class of solid-state photodetectors which are based on a reverse-biased pn junction in which a single charge carrier generated by a photon can possibly initiate an avalanche-like current on account of an impact ionization mechanism. A fundamental difference between a SPAD and a conventional avalanche photodiode (APD) may reside in the fact that the SPAD can be specifically designed for operating at a bias voltage in the reverse direction which is above the breakdown voltage of the diode. This operating mode is also designated as the Geiger mode, by analogy with a Geiger counter. At such high bias voltages, the electrical field within the pn junction can be so great that a single charge carrier injected into the depletion zone can initiate a self-sustaining avalanche-like current. The current can rise within a time period of less than 1 ns to a macroscopic level in the mA range, for example. The current can be maintained until the avalanche is quenched by the bias voltage being lowered to a level below the breakdown voltage and the avalanche current is terminated in this way. In this case, a simple quenching circuit can consist of a single resistor connected in series with the SPAD. In this case, the avalanche current self-quenches simply on account of the voltage drop arising across the high-value series resistor. After the avalanche current has been quenched, the bias voltage of the SPAD recovers and the SPAD is again able to be triggered again. While the avalanche current flows and during the quenching and the subsequent recovery of the bias voltage, however, during a dead time τ, the SPAD may be unable to detect further photons.

With the size of an individual SPAD, this results in an upper limit for the maximum detectable intensity (power per area) or the maximum detectable photon current or photon rate. The photon rate absorbed per detector can be lowered by distributing the light power over a plurality of SPADs. It is thus possible to improve the detection efficiency at high light powers, as can occur in particular in the case of short measurement distances. In this case, the light power can be understood to be the entire light power, acquired by the reception lens, of the measurement radiation returning from the target object.

Figure 2:
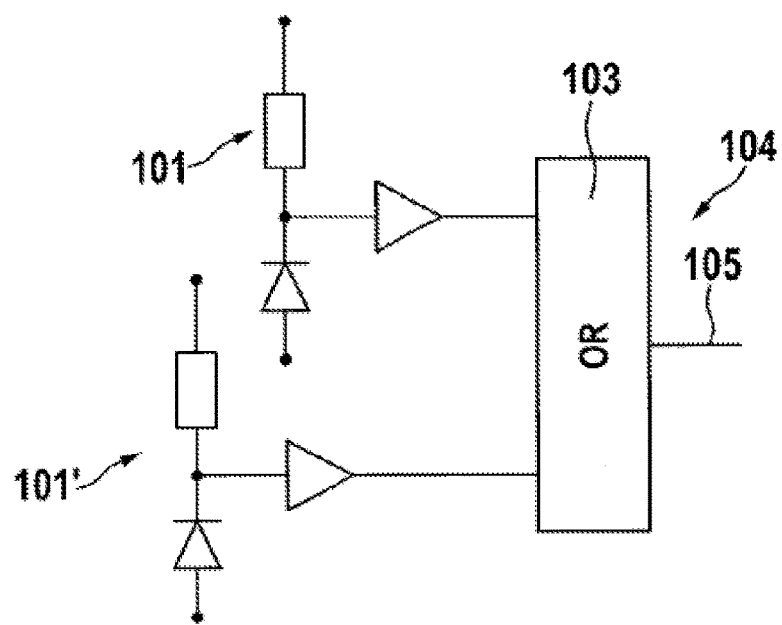
FIG. 2 shows a schematic electric network of two SPADs, which are connected to a combiner, for a measuring device in accordance with one embodiment of the present disclosure.

FIG. 2 shows two SPADs 101, 101', the detection signals of which are respectively transmitted to an OR gate 103. The OR gate 103 serves as a combiner 104 by virtue of receiving both detection signals from the first SPAD 101 and detection signals from the second SPAD 101' and emitting a combined signal of these input signals at an output 105.

The situation can be more complicated when using a combiner which combines the detection signals of a plurality of individual SPADs on a bus. The dead time to be assigned to the bus can lead to additional losses of efficiency compared with a fully parallel evaluation of a totality of SPADs.

By temporally shortening the digital signals generated by the individual SPADs by means of a pulse shortener, it is possible to shorten an effective dead time of an overall system consisting of a plurality of SPADs connected to a bus. In this case, the effective dead time of the overall system results from a combination of the dead time of the individual SPADs and the duration of the signals shortened by the shorteners.

Figure 3:
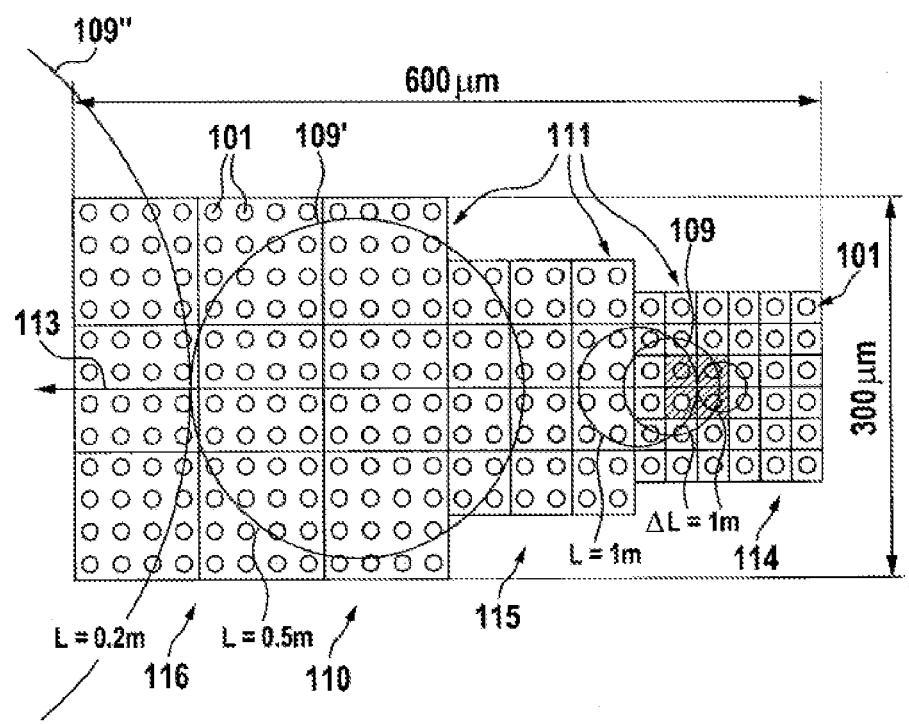
FIG. 3 shows a top view of a detection area of a reception apparatus for a measuring device in accordance with one embodiment of the present disclosure.

FIG. 3 schematically shows a detection area 110 of a laser ranging device according to the disclosure. Here, circular laser spots 109, the diameter of which varies dependent on a distances L between the measuring device and the target object, are plotted on the detection area 110. In this case, an ideal lens with a focal length f=30 mm, a diameter d=4 mm and a parallax of 5 mm was assumed for the case of optimum adjustment to large distances. Here, the laser radiation was assumed to have divergence of 1 mrad. In this embodiment of the detection area 110, it is advantageous that the size of the pixels 111 or the number of SPADs 101 within the respective pixels 111 increases along the parallax axis 113. Here, the parallax axis is assumed to be the straight line of an intersection between a detection area plane and a plane spanned by the optical axis of the reception optical unit and the laser beam axis of the ranging device. What can be identified is that small pixels are provided in a first region 114, onto which the laser spot 109 impinges if the laser beam is radiated back from a target object that is far away, which small pixels each contain only a single SPAD. Larger pixels with in each case four SPADs are provided in a region 115 onto which the laser spot 109' impinges if the target object is at a distance of approximately 0.5 to 1 m. Particularly large pixels with 8 or 16 SPADs are provided in a further region 116, onto which the laser spots 109" impinges in the case of very close target objects. Here, the reception optical unit is optimized in such a way that the best possible imaging quality, i.e. the smallest possible laser spot diameter on the detection area, is achieved at the largest distance of the target object.

As a result of the in-focus imaging, the laser spot 109 is comparatively small at large distances. At the same time, the intensity of the impinging light, composed of returning measurement radiation and background radiation, is comparatively low as a result of the small component of the measurement radiation from the target object that is far away. In the case of target objects positioned more closely, more measurement radiation overall is reflected or scattered back to the detection area 110 from the target object. At the same time, the measurement radiation is no longer imaged in focus on the detection area 110 by the fixed focus reception optical unit.

Overall, a geometric consideration for a laser ranging instrument with a slightly divergent laser beam and a fixed focus reception optical unit results in a light intensity, in the detector plane, for the component of the received laser radiation which drops off quadratically with the distance in the case of large distances and which is constant with the distance in the case of small distances. By contrast, to a first approximation, the intensity component of the background radiation is independent of distance. Moreover, what can be achieved with a spatially dependent design of the size of the pixels 101 contained in the detection area 110, as illustrated in FIG. 3, is that a laser spot 109 respectively impinges on a plurality of pixels 111, both in the case of large distances of the target object and in the case of small distances of the target object, and can be evaluated by said pixels. Here, the size of the active detection area can be optimally adapted to the size of the laser spot and hence it is possible to optimize the signal-to-noise ratio. Secondly, using such a spatially dependent design, it is also possible to use the dynamic range of the SPADs in an optimum fashion since the light intensity of the impinging light (laser portion and background portion) is lower at large distances than at small distances. It is therefore possible to reduce the area of the individual SPADs in the case of those detector areas which are only impinged by received measurement radiation in the case of small distances. In detector regions in which the intensity of the received measurement radiation remains virtually constant, the number of SPADs 101 contained in the individual pixels 111 can be increased in the case of unchanging area of the SPADs.

Figure 4:
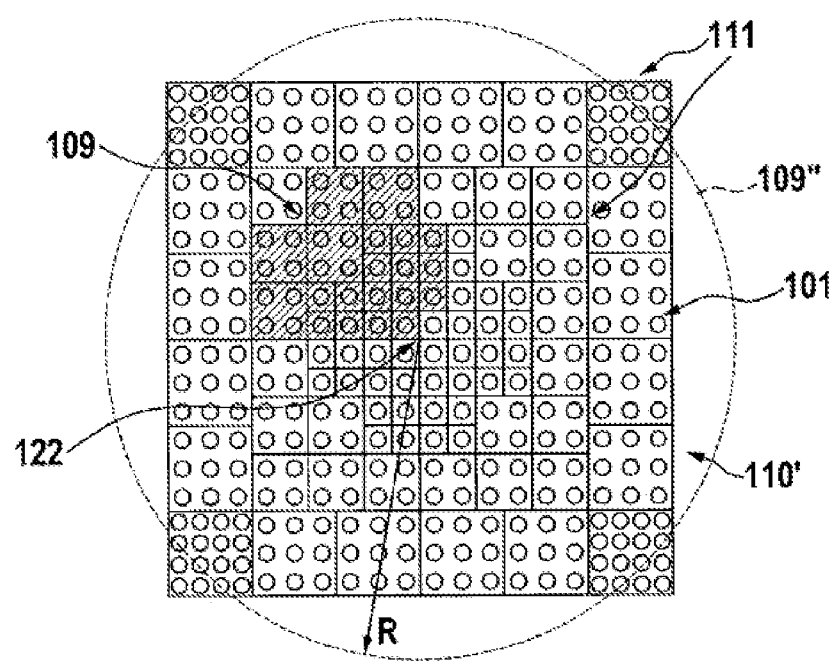
FIG. 4 shows a top view of an alternative detection area of a reception apparatus for a measuring device in accordance with one embodiment of the present disclosure.

FIG. 4 shows an embodiment of a detection area 110' for a coaxial laser ranging instrument. A laser beam returning from a target object that is far away is focused well and generates a relatively small laser spot 109 in the vicinity of the center 122 of the detection area 110', i.e. in the vicinity of the penetration point of the optical axis of the reception optical unit through the detection area plane. A laser beam returning from a more closely situated target object generates a laser spot 109" with a substantially larger diameter. The pixels 111 have a smaller area in the vicinity of the center 122 and a smaller number of SPADs 101 contained therein than at a distance from the center 122 of the detection area 110', i.e. at the edge of the detection area.

Figure 7:
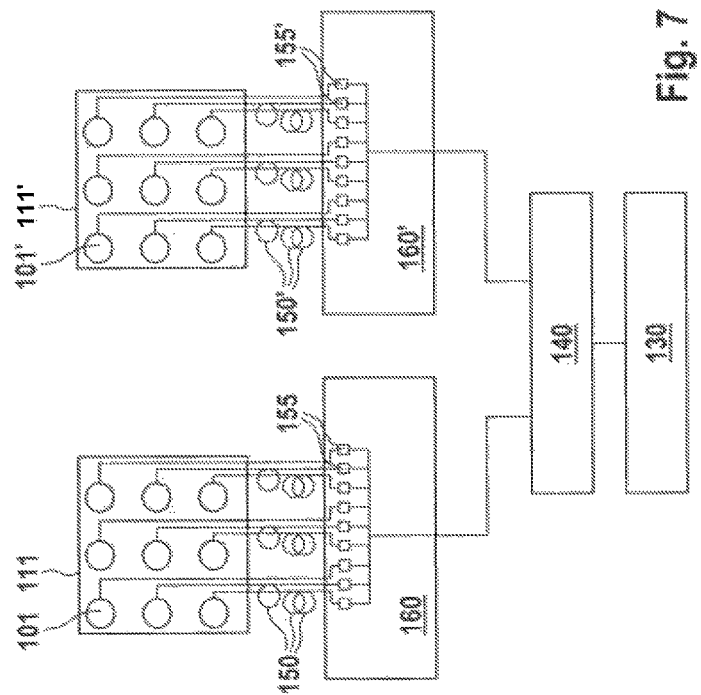
FIG. 7 shows two pixels with in each case 9 SPADs, which are connected to a distance determination apparatus via combiners and multiplexers.
Figure 6:
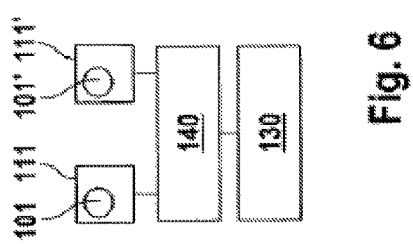
FIG. 6 shows two SPADs which are connected to a distance determination apparatus via a multiplexer.
Figure 5:
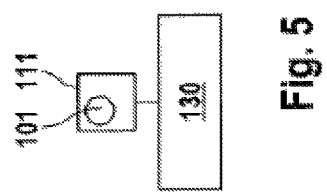
FIG. 5 shows an individual SPAD, which is connected to a distance determination apparatus.

In FIGS. 5 to 7, individual elements, as utilized to realize a reception apparatus in accordance with embodiments of the present disclosure, are illustrated in a block diagram.

FIG. 5 shows a pixel 111 with a single SPAD 101. The pixel is connected to a distance determination apparatus 130.

FIG. 6 shows two pixels 111, 111', each with one SPAD 101, 101'. The pixels 111, 111' are connected to a multiplexer 140, which selectively transmits the detection signals supplied by the pixels 111, 111' to a distance determination apparatus 130.

FIG. 7 illustrates an arrangement of two pixels 111, 111' with in each case nine SPADs 101, 101'. The detection signals from the individual SPADs 101, 101' are, optionally after a time delay caused by additional retardation elements 150, 150', in each case transmitted to a combiner 160, 160'. The retardation can serve the compensation of run-time differences and hence the time synchronization of the SPADs of a pixel or different pixels. The detection signals are combined to one another in the combiners 160, 160'. The signals generated by the SPADs can additionally be shortened in time with the aid of pulse shorteners 155, 155'. The combined detection signals are routed to a multiplexer 140 by the combiners 160, 160' and, from said multiplexer, on to a distance determination apparatus 130.

Figure 8:
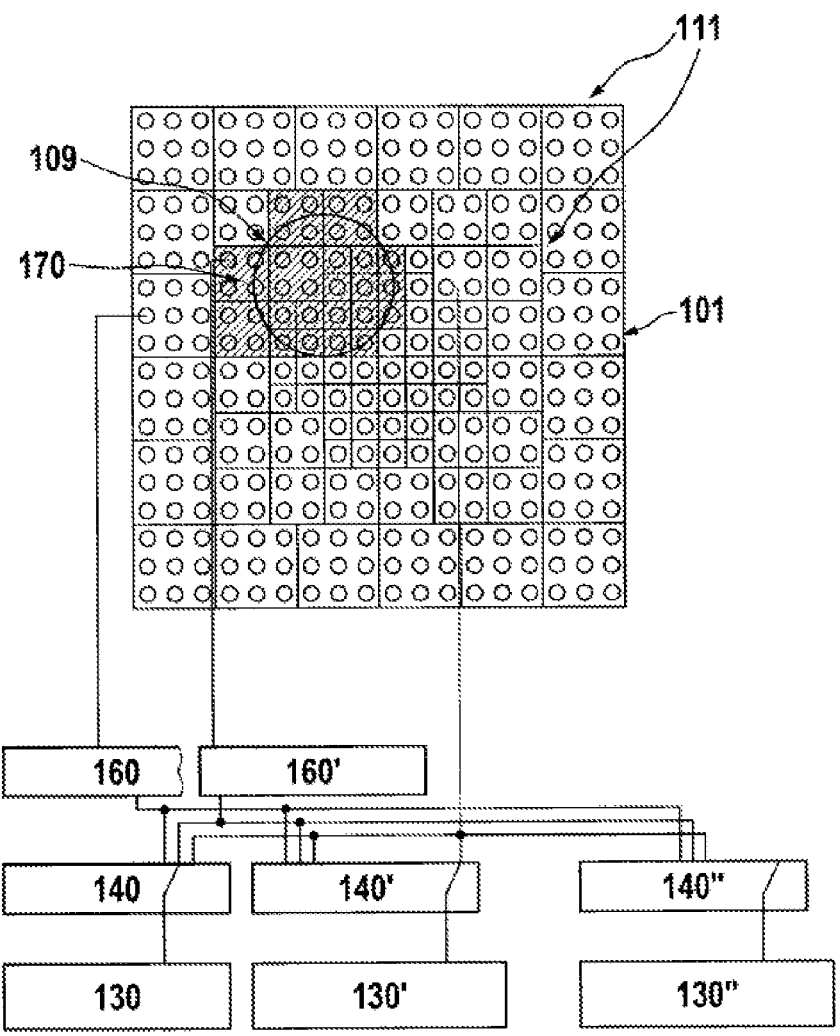
FIG. 8 shows a detection area of a reception apparatus with pixels in which the number of SPADs contained in the pixels varies depending on location and which are connected to several distance determination apparatuses via combiners and multiplexers.

FIG. 8 shows a special embodiment for a ranging device using such elements for N=92 pixels 111. Here, pixels merely have a single SPAD, 24 pixels respectively have four SPADs in a 2×2 arrangement and 20 pixels respectively have 9 SPADs in a 3×3 arrangement. Each pixel 111 with more than one SPAD 101 is connected to precisely one combiner 160, 160'. Accordingly, there are 44 combiners 160. The outputs of the pixels 111 with only one SPAD or the outputs of the combiners 160 are connected to the inputs of K multiplexers 140. The outputs of the multiplexers 140 are in turn connected to M distance determination apparatuses 130. Here, neither M=K nor M=N necessarily applies. The connections for three pixels 111 of different size and with a different number of SPADs are illustrated in an exemplary manner. An area shaded in FIG. 11 reproduces an effective detector area 170, which comprises those pixels 111 which are in fact illuminated by laser light of the laser spot 109 and on the basis of which ranging to the target object can be carried out.

Figure 9A:
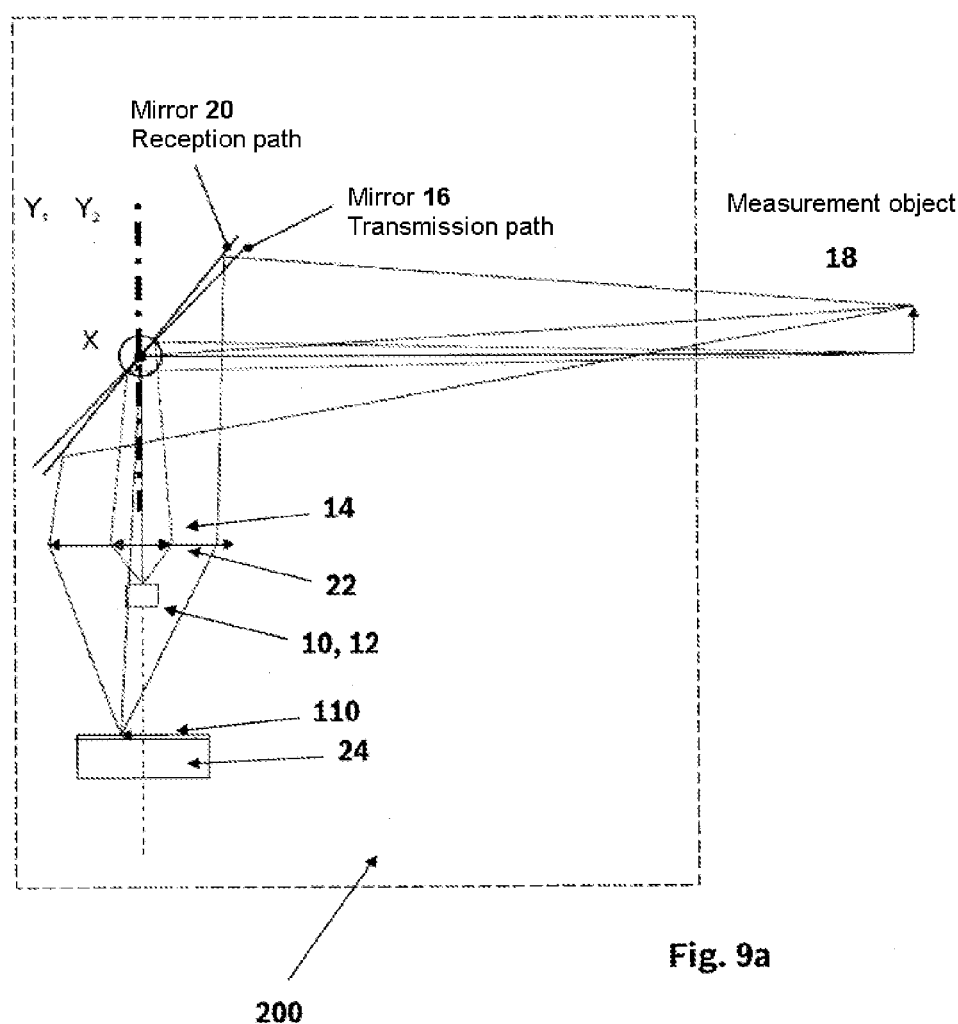
FIG. 9 shows, in a schematic illustration, a measuring instrument according to the disclosure in two different views.
Figure 9B:
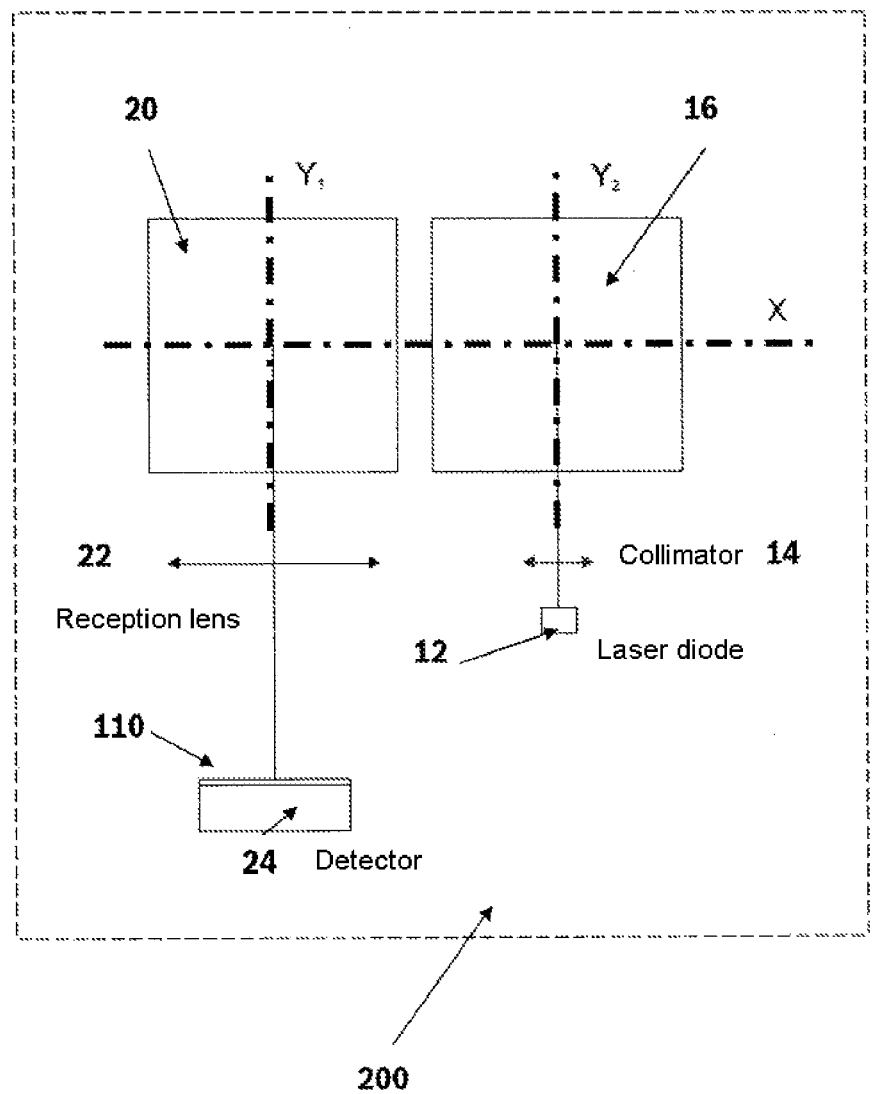

FIG. 9 shows, very schematically in two views corresponding to FIG. 1, a measuring instrument according to the disclosure, which has at least one measuring device in the housing 200 thereof. Such a measuring instrument, which in particular is embodied as a hand-held measuring instrument, can have an output unit in the form of a display. Moreover, the measuring instrument according to the disclosure has a device-internal energy supply in the form of replaceable batteries or rechargeable battery cells. A corresponding energy source which is fixedly integrated into the housing and can be unloaded by means of an interface on the housing is also possible.

Moreover, the beam path, for example the transmission and reception path in the housing 200, can also be optically folded once again in order to avoid a measurement "around the corner". This has operational advantages for the user, particularly in the embodiment as hand-held measuring instrument.

Finally, aspects and advantages of embodiments of the disclosure should once again be summarized in other words:

A core of the disclosure lies in combining a large-area time-resolving optical sensor with separate optical systems for transmission and reception path for angle-resolving laser ranging configured substantially according to the prior art.

Here, the optical sensor in particular has a detection area with a multiplicity of pixels, wherein each pixel has at least one SPAD (single photon avalanche photodiode) and wherein every one of the multiplicity of pixels is connected to an evaluation apparatus.

Such a measuring device can advantageously be integrated into a compact housing, which can, in particular, be designed to be hand-held, such that a correspondingly compact measuring instrument is made possible.

The measuring system according to the disclosure places lower demands on the time-resolution capability of the electronic signal processing device compared to a pulse run-time measurement with a comparable accuracy by using a mixing and phase-measuring method.

The measuring system according to the disclosure has a very good optical separation between transmission and reception path (required in particular for phase-measuring methods).

The measuring system according to the disclosure places lower adjustment demands on transmission and reception path as a result of the large-area detector.

The measuring system according to the disclosure provides the option of improving the signal-to-noise ratio and hence the range by virtue of use being made of a detector array with selectable pixels.

The measuring system according to the disclosure enables significant cost savings as a result of a SPAD detector array being used.

One embodiment of the disclosure is based on the concept of using a large-area detector for scanning ranging, in which large-area detector the type of arrangement of individual SPADs in pixels, the signals of which are combined prior to being fed to a temporal evaluation unit (i.e. a distance determination apparatus/a binning scheme) for further evaluation, has an advantageous embodiment. Here, the number of SPADs whose signals are combined by means of a combiner form one pixel.

The individual pixels can be operated independently of one another. In particular, it is possible to carry out a phase evaluation of a continuous wave or, alternatively, a flight-time evaluation of a pulse for each individual pixel.

As a result of this, it is possible to realize a scanning ranging system, the assembly and adjustment precision of which can be significantly reduced. In particular, this also makes it possible, for the first time, to realize a hand-held scanning ranging system.

A combination of several SPADs to form pixels can spatially be designed in such a way that the signal-to-noise ratio can be optimized both at large and at small distances, particularly under strong background illumination, with few distance determination apparatuses. This can be achieved by an adaptation of the detection area, depending on location, in terms of the size of the pixels or the number of SPADs that are combined to form a pixel.

The type of arrangement of optionally pixels having only one SPAD or pixels having different sizes and numbers of SPADs, said type of arrangement being specifically optimized toward increasing the signal-to-noise ratio in a laser ranging device, constitutes one of the distinguishing features both with respect to conventional laser ranging devices and with respect to 3D cameras. This arrangement can reduce the demands made for alignment of an optical unit within the measuring device and can simultaneously contribute to an optimized signal-to-noise ratio, even if the reception apparatus does not lie in the image plane of the optical unit, as can occur in the case of fixed-focus systems, for example.

In particular, it is possible to realize a compact, in particular hand-held measuring instrument for multi-dimensional measuring of a target object by means of the above-described measuring system.

A detection area can be dimensioned to be so large that the demands on the adjustment of the reception optical unit can be reduced. Moreover, the influence of optical aberrations, in particular the aberrations due to defocusing as a result of the too small depth-of-field, can be minimized. As a result, the demands on the optical quality of the reception optical unit can be reduced.

A further advantage can lie in the optimization of the signal-to-noise ratio, particularly in the case of large measurement distances in the case of a high background light proportion. This can be achieved by virtue of the fact that, at all distances, the effective detection area can be adapted, i.e. minimized, in an optimum fashion to the size of the actually imaged laser measurement spot in the detection plane. After the completed measurement, the signals can be evaluated in a targeted manner from only those individual SPADs or pixels with several SPADs which actually receive laser radiation. As a result, it is possible to reduce the effective detection area and minimize the noise contribution of the background light, which can be equivalent to improving the signal-to-noise ratio.

A further advantage can consist of the fact that, as a result of combining several SPADs within a pixel, there is a need for fewer distance determination apparatuses than there are SPADs. This can reduce a required chip area of an integrated circuit. This advantage can play an important role, particularly in the case of laser ranging instruments which generally operate with a fixed focal length, since the laser spot diameter can then vary depending on the distance of the target object. FIG. 6 illustrates this for a system in which the parallax error is not corrected. In order to optimize the signal-to-noise ratio by minimizing the effective detection area, as described above, it is possible in the case of larger laser spot diameters, i.e. generally in the case of smaller distances of the target object, that accordingly only a lower resolution of the detector is required. These circumstances can be utilized by the spatially dependent combination of SPADs to form pixels.

Since the effective detection area, i.e. the area that is taken into account in the evaluation of the measurement, is generally smaller than the overall detection area, the number of required distance determination apparatuses can be further reduced by virtue of a multiplexer also being applied in addition to the combination of SPADs. With the aid of preliminary measurements, the pixels receiving laser radiation can initially be identified in this case and said pixels can subsequently be distributed over the distance determination apparatuses for the actual measurement. If N is the overall number of pixels with one or more SPADs and M is the number of distance determination apparatuses available for the evaluation, then at most N/M preliminary measurements (rounded up) have to be carried out for identification purposes. The measurement object can therefore be carried out using few measurements, ideally using a single measurement.

A further advantage can lie in the fact that individual pixels can be calibrated independently of one another, for example in respect of a phase offset.

The invention claimed is:

1. A hand-held measuring device, for multi-dimensional measuring of a target object, comprising:
   a phase measuring system configured to carry out in sequence a measurement of a distance to individual object points of the target object;
   a transmission apparatus configured to emit optical measurement radiation toward the target object;
   a reception apparatus including a detection area configured to detect optical measurement radiation returning from the target object, the detection area having a plurality of pixels, each pixel of the plurality of pixels includes at least one SPAD;
   a scanning system configured to deflect the optical measurement radiation; and
   an evaluation apparatus configured to determine distance measurement values, every pixel of the plurality of pixels being connected to the evaluation apparatus,
   wherein the scanning system has a first galvano scanner for deflecting the optical measurement radiation emitted by the transmission apparatus toward the target object,
   wherein the scanning system has a second galvano scanner for deflecting the optical measurement radiation returning from the target object onto the reception apparatus, and
   wherein the first galvano scanner and the second galvano scanner are rotated synchronously about at least one axis.

2. The measuring device as claimed in claim 1, wherein the transmission apparatus and the reception apparatus are configured such that the optical measurement radiation returning from the target object illuminates a multiplicity of pixels of the plurality of pixels at the same time.

3. The measuring device as claimed in claim 1, wherein the evaluation apparatus is configured to establish a distance between the measuring device and the target object based on an evaluation of detection signals from a multiplicity of pixels of the plurality of pixels.

4. The measuring device as claimed in claim 1, wherein the evaluation apparatus has at least one distance determination apparatus configured (i) to establish a flight time of measurement radiation between an emission by the transmission apparatus and a detection of the optical measurement radiation returning from the target object, and (ii) to determine a distance therefrom.

5. The measuring device as claimed in claim 1, wherein:
   a multiplicity of pixels of the plurality of pixels are connected to a distance determination apparatus, and
   the distance determination apparatus is configured to determine the distance based on detection signals from the multiplicity of pixels.

6. The measuring device as claimed in claim 1, wherein:
   the evaluation apparatus has a plurality of distance determination apparatuses, and
   the evaluation apparatus is configured to determine the distance between the measuring device and the target object based on the distances determined by the distance determination apparatuses.

7. The measuring device as claimed in claim 1, wherein at least some pixels of the plurality pixels each contain a plurality of SPADs.

8. The measuring device as claimed in claim 7, further comprising:
   at least one combiner configured to combine detection signals from SPADs which are contained in a single pixel of the plurality of pixels.

9. The measuring device as claimed in claim 7, further comprising:
   at least one pulse shortener configured to shorten a digital signal generated by one of the SPADs in time.

10. The measuring device as claimed in claim 7, wherein a number of the SPADs contained in a pixel of the plurality of pixels varies dependent on a location of the pixel within the detection area of the reception apparatus.

11. The measuring device as claimed in claim 7, wherein an area of SPADs contained in a pixel of the plurality of pixels varies dependent on a location of the pixel within the detection area of the reception apparatus.

12. The measuring device as claimed in claim 10, wherein the number of SPADs contained in a pixel of the plurality of pixels is smaller in pixels close to the transmission apparatus than in pixels remote from the transmission apparatus.

13. The measuring device as claimed in claim 10, wherein the number of SPADs contained in a pixel of the plurality of pixels is smaller in pixels close to a center of the detection area than in pixels remote from the center of the detection area.

14. The measuring device as claimed in claim 1, wherein the transmission apparatus and the reception apparatus are configured such that a number of pixels of the plurality of pixels which are illuminated simultaneously by the optical measurement radiation returning from the target object varies dependent on a distance between the target object and the measuring device.

15. The measuring device as claimed in claim 1, wherein the reception apparatus and the evaluation apparatus are configured to allow detection signals from individual pixels of the plurality of pixels to be evaluated by the evaluation apparatus, independently of detection signals from other pixels of the plurality of pixels.

16. The measuring device as claimed in claim 1, wherein the reception apparatus and the evaluation apparatus are configured to establish a distance between the measuring device and the target object based on an evaluation of detection signals only from pixels of the plurality of pixels within an effective detection area onto which light from an area of the target object illuminated by the transmission apparatus is radiated back.

17. The measuring device as claimed in claim 1, further comprising:
at least one multiplexer configured to transmit detection signals from a multiplicity of pixels of the plurality of pixels to the evaluation apparatus in a selective manner.

18. A measuring instrument, comprising:
a housing; and
at least one measuring device, integrated in the housing, the at least one measuring device being configured for multi-dimensional measuring of a target object, and the at least one measuring device including:
a phase measuring system configured to carry out in sequence a measurement of a distance to individual object points of the target object,
a transmission apparatus configured to emit optical measurement radiation toward the target object,
a reception apparatus including a detection area configured to detect optical measurement radiation returning from the target object, the detection area having a plurality of pixels, each pixel of the plurality of pixels includes at least one SPAD,
a scanning system configured to deflect the optical measurement radiation, and
an evaluation apparatus configured to determine distance measurement values, every pixel of the plurality of pixels being connected to the evaluation apparatus,
wherein the scanning system has a first galvano scanner for deflecting the optical measurement radiation emitted by the transmission apparatus toward the target object, and
wherein the scanning system has a second galvano scanner for deflecting the optical measurement radiation returning from the target object onto the reception apparatus, and
wherein the first galvano scanner and the second galvano scanner are rotated synchronously about at least one axis.

19. The measuring instrument as claimed in claim 18, wherein the measuring instrument is a hand-held measuring instrument.

20. A hand-held measuring device, for multi-dimensional measuring of a target object, comprising:
a phase measuring system configured to carry out in sequence a measurement of a distance to individual object points of the target object;
a transmission apparatus configured to emit optical measurement radiation toward the target object;
a reception apparatus including a detection area configured to detect optical measurement radiation returning from the target object along a reception path, the detection area having a plurality of pixels, each pixel of the plurality of pixels includes at least one SPAD;
a scanning system configured to deflect the optical measurement radiation, the scanning system employing a first galvano scanner for a transmission path and a second galvano scanner for a reception path; and
an evaluation apparatus configured to determine distance measurement values, every pixel of the plurality of pixels being connected to the evaluation apparatus,
wherein the first galvano scanner and the second galvano scanner are rotated synchronously about at least one axis.

* * * * *